US009421460B2

(12) United States Patent
Zhu et al.

(10) Patent No.: US 9,421,460 B2
(45) Date of Patent: Aug. 23, 2016

(54) OFFLINE PROGRESS OF CONSOLE GAME VIA PORTABLE DEVICE

(75) Inventors: Yunpeng Zhu, Foster City, CA (US); Steven Osman, San Francisco, CA (US); Jeffrey Roger Stafford, Redwood City, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 493 days.

(21) Appl. No.: 12/873,128

(22) Filed: Aug. 31, 2010

(65) Prior Publication Data

US 2012/0052954 A1   Mar. 1, 2012

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/30 | (2014.01) |
| A63F 13/40 | (2014.01) |

(52) U.S. Cl.
CPC .............. *A63F 13/12* (2013.01); *A63F 13/10* (2013.01); *A63F 2300/406* (2013.01); *A63F 2300/538* (2013.01)

(58) Field of Classification Search
CPC ..... G07F 17/3223; A63F 13/12; A63F 13/10; A63F 2300/406; A63F 2300/538
USPC .......... 463/16–23, 25–33, 39–43, 9; 273/138.1, 139, 138.2, 141 A, 454–456, 273/460; 705/56–57, 64, 67, 72, 74–75, 705/78–79; 709/203–207, FOR. 113; 713/1, 713/100, 150, 155, 170, 176, 182–184, 713/186–189, 300, 375, 400, 500, 600; 902/2–5, 23, 38, 40
IPC .............. A63F 13/00,13/12, 9/24; G06F 17/00, G06F 19/00
See application file for complete search history.

(56) References Cited

U.S. PATENT DOCUMENTS

| | | | | |
|---|---|---|---|---|
| 6,247,048 | B1 * | 6/2001 | Greer et al. | 709/219 |
| 6,932,698 | B2 * | 8/2005 | Sprogis | 463/9 |
| 7,611,409 | B2 * | 11/2009 | Muir et al. | 463/29 |
| 7,632,186 | B2 * | 12/2009 | Spanton et al. | 463/40 |
| 7,699,703 | B2 * | 4/2010 | Muir et al. | 463/29 |
| 7,972,214 | B2 * | 7/2011 | Kinsley et al. | 463/42 |
| 8,057,298 | B2 * | 11/2011 | Nguyen et al. | 463/25 |
| 8,181,115 | B2 * | 5/2012 | Irving | 715/753 |
| 2002/0111216 | A1 * | 8/2002 | Himoto et al. | 463/43 |
| 2003/0027634 | A1 * | 2/2003 | Matthews, III | 463/39 |
| 2003/0114224 | A1 * | 6/2003 | Anttila et al. | 463/40 |

(Continued)

*Primary Examiner* — Omkar Deodhar
*Assistant Examiner* — Wei Lee
(74) *Attorney, Agent, or Firm* — Martine Penilla Group, LLP

(57) ABSTRACT

Methods systems and computer programs method for playing a game using a portable device are presented. One method includes operations for establishing a connection between a portable device and a computing system executing a game, and for receiving a task at the portable device from the computing system. Further, the portable device is disconnected from the computing system allowing the task to be performed using the portable device independently from the computing system. The method includes interaction of a user with the portable device to receive at the portable device input from the user to perform the task. Once the task is performed, the portable device reports that the task has been performed to the computing system. As a result, the game being executed in the computing system progresses after the portable device reports that the task has been performed.

7 Claims, 14 Drawing Sheets

(56) References Cited

U.S. PATENT DOCUMENTS

| | | | |
|---|---|---|---|
| 2003/0115240 A1* | 6/2003 | Cho | 709/102 |
| 2004/0117528 A1* | 6/2004 | Beacher et al. | 710/111 |
| 2005/0245317 A1* | 11/2005 | Arthur et al. | 463/42 |
| 2006/0223635 A1* | 10/2006 | Rosenberg | 463/37 |
| 2007/0037614 A1* | 2/2007 | Rosenberg | 455/575.1 |
| 2008/0171600 A1* | 7/2008 | Ostergren et al. | 463/42 |
| 2008/0228347 A1* | 9/2008 | Craik | 701/33 |
| 2008/0280684 A1* | 11/2008 | McBride et al. | 463/42 |
| 2008/0294417 A1* | 11/2008 | Brunstetter et al. | 703/21 |
| 2009/0036186 A1* | 2/2009 | Benco et al. | 463/9 |
| 2011/0185390 A1* | 7/2011 | Faenger et al. | 725/75 |
| 2011/0289308 A1* | 11/2011 | Sobko et al. | 713/100 |

\* cited by examiner

OFFLINE PROGRESS OF CONSOLE GAME VIA PORTABLE DEVICE

BACKGROUND

1. Field of the Invention

The present invention relates to methods, systems, and computer programs for playing a game with a portable device, and more particularly, methods, systems, and computer programs for playing a game with a computing system or with a portable device.

2. Description of the Related Art

The video game industry has seen many changes over the years. Example gaming platforms include the Sony PlayStation™, Sony PlayStation2 (PS2), or Sony PlayStation 3 (PS3), each of which is sold in the form of a game console. The game console is designed with specialized processing hardware, including a Central Processing Unit (CPU), a graphics synthesizer for processing intensive graphics operations, a vector unit for performing geometry transformations, and other glue hardware, firmware, and software.

Mobile gaming platforms are designed for playing games without the need to be attached to a display or a power source. Examples mobile gaming platforms include Sony PlayStation Portable (PSP) and PSP Go. Additionally, other devices whose main function is other than playing games can also provide mobile gaming functionality, such as cell phones, Personal Digital Assistants (PDA), MP3 players, etc. Online gaming is also possible, wherein a user can interactively play against or with other users over the Internet.

As game complexity continues to intrigue players, gaming software and hardware manufacturers have continued to innovate to enable additional interactivity. Although many users play games in different platforms, most games are designed for a single platform. Also, games played on a game console or on a personal computer do not allow the user to play when the user is away from the game platform.

It is in this context that embodiments of the invention arise.

SUMMARY

Embodiments of the present invention provide methods, systems and computer programs for playing a game using a portable device. A computing device, such as a game console or a personal computer executing a game or a program, interacts with the portable device to enable the user to perform game related tasks away from the computing device using the portable device.

It should be appreciated that the present invention can be implemented in numerous ways, such as a process, an apparatus, a system, a device or a method on a computer readable medium. Several inventive embodiments of the present invention are described below.

In one embodiment, a method includes operations for establishing a connection between a portable device and a computing system executing a game, and for receiving a task at the portable device from the computing system. Further, the portable device is disconnected from the computing system allowing the task to be performed using the portable device independently from the computing system. The method includes interaction of a user with the portable device to receive at the portable device input from the user to perform the task. Once the task is performed, the portable device reports that the task has been performed to the computing system. As a result, the game being executed in the computing system progresses after the portable device reports that the task has been performed.

In another embodiment, a system for playing a game using a portable device includes a computing system executing a game, and a portable device. The portable device is configured to connect to the computing system to receive a task from the computing system. The task can be performed using the portable device when the portable device is connected to the computing system and when the portable device is disconnected from the computing system, where the portable device enables user interaction to perform the task. Further, the portable device reports that the task has been performed to the computing system after completion of the task, and the game progresses after the portable device reports that the task has been performed.

In yet another embodiment, a computer program includes program instructions for establishing a connection between a portable device and a computing system executing a game, and program instructions for receiving a task at the portable device from the computing system. Further, the portable device is disconnected from the computing system allowing the task to be performed using the portable device independently from the computing system. The computer program further includes program instructions that enable interaction of a user with the portable device to receive at the portable device input from the user to perform the task. Once the task is performed, information is saved at the portable device regarding the performed task, and the portable device reports that the task has been performed to the computing system. As a result, the game being executed in the computing system progresses after the portable device reports that the task has been performed.

In one more embodiment, a method for playing a game using a portable device includes an operation for establishing a connection between a portable device and a computing system executing a game. Further, the method receives a task at the portable device from the computing system using the connection. The method includes an operation for completing the task using the portable device, where the task is defined to be completed independently from the computing system and without using the connection. Input is received at the portable device from a user to perform the task, and the portable device reports that the task has been performed to the computing system, where the game being executed in the computing system progresses after the portable device reports that the task has been performed.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods, apparatus, and computer programs for playing a game on both a static computing device and a portable device. A player playing a game on a static computing device, such as a game console or a Personal Computer (PC), is limited to play where the static computing device is located. Embodiments of the invention allow players to perform game-related tasks away from the computing device and increase the number of ways in which a player can interact with a computer game.

It will be obvious, however, to one skilled in the art, that the present invention may be practiced without some or all of these specific details. In other instances, well known process operations have not been described in detail in order not to unnecessarily obscure the present invention.

Figure 1:
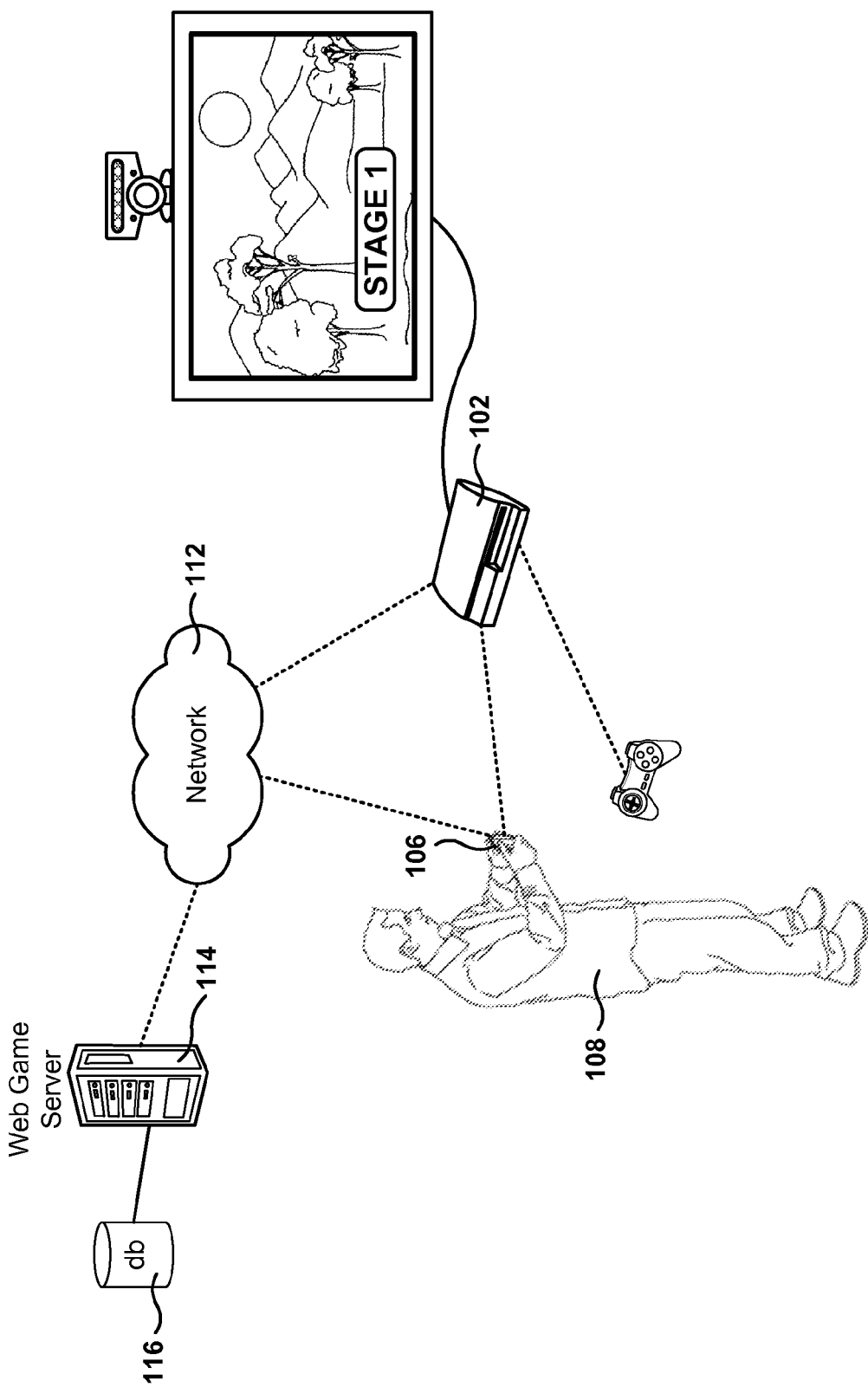
FIG. 1 depicts a user interacting with a game console using a portable device, according to one embodiment.

FIG. 1 depicts user 108 interacting with game console 102 using portable device 106, according to one embodiment. A game executing in game console 102 includes capabilities to enhance the gaming experience by asking user 108 to find real world items and capture them with a camera on portable device 106. These items can refer to people, have a particular shape or texture, a CyberCode found in retail stores, a specific location, a web page, a newspaper, etc.

The goals, also referred to herein as tasks, are transmitted to portable device 106 while the player interacts with the game console by establishing a short-range connection between game console 102 and portable device 106. For example, the connection can be made via Bluetooth, infrared (IR), Wi-Fi, USB, etc. In another embodiment, game console 102 transmits the goal to database 116, which is accessed through server 114 attached to network 112. Database 116 can keep a variety of game related data, such as achievements by the player, progress in the game, game status, completed and pending tasks, etc.

Player 108 accesses database 116 to retrieve the list of goals that can be performed on the portable device. Once the player performs an action, such as taking a picture of an object, portable device 106 determines if the goal has been completed. If the goal has been completed, the player can bring the portable device 106 back to the game console 102 to transfer the results, or portable device 106 can simply transmit back to database 116, which can be later accessed by game console 102.

Static devices, such as consoles and PCs, are not designed for portability. Therefore, it is very difficult to detach the gaming experience from the living room. For example, a player cannot take a game console to a coffee shop to continue playing the game while drinking coffee. Embodiments of the invention allow players to perform tasks away from a static device and add mobility to computer games and computer programs.

It should be noted that some embodiments of the invention are described below in reference to a game console and a portable device, but principles of the invention can equally be applied to a variety of devices, as long as tasks are set using one device and completed using a different device. For example, the first computer device can be a game console, a PC, a laptop, a first portable device that sets the tasks, a Personal Digital Assistant (PDA), a smart phone, etc. Similarly, the second computer device can be any portable device that is intended to be easily transported and operated at multiple locations. Examples of portable devices include a portable game player, a smart phone, a laptop computer, a notebook computer, a tablet computer, a book reader, a PDA, a mobile phone, a digital camera, a video camera, a sound recorder, a memory stick, etc. Further, the program executing in the computing device does not have to be a game and can also be any other type of program that can be executed on the computing device.

Multiple examples of tasks to be performed remotely are described herein, but the person skilled in the art would readily appreciate that many other tasks can be set by the game console, as long as a task can be performed independently from the game console using a second computing device. Additionally, several forms of interaction between the console, the portable, and the server are presented below, but other forms of interaction are possible. For example, game status can be kept by the game console or by the game server, and the portable device can update the game status by communicating with the game console or communicating with the server. The embodiments presented here should therefore not be interpreted to be exclusive or limiting, but rather exemplary or illustrative.

Figure 2:
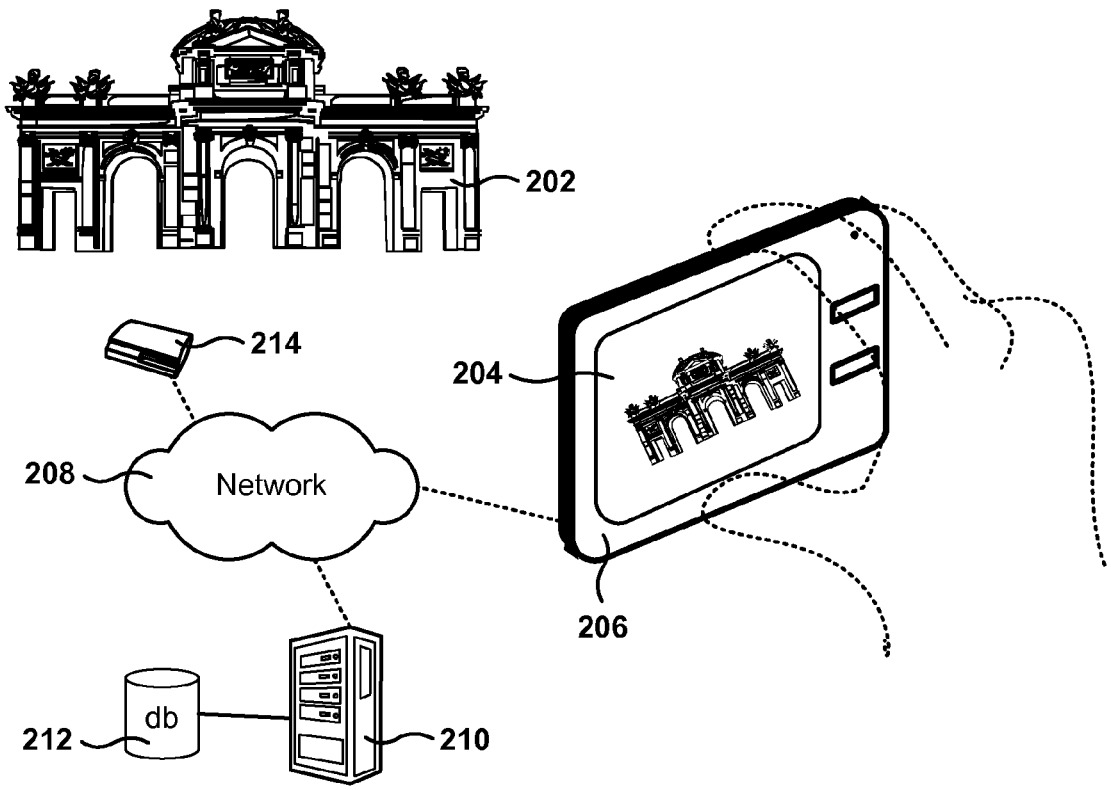
FIG. 2 depicts one embodiment of a player completing a task by taking a picture of a monument.

FIG. 2 depicts one embodiment of a player completing a task by taking picture 204 of monument 202. Specially designed console games can set tasks for the player to complete on the portable device using the portable device's camera. These goals can be required to make progress on the console game, or the goals can simply be optional goals that award players optional in-game items. Here are some examples of tasks that can be performed using a camera:

Take a picture of a specific item, such as a monument, a certain person, a store, a car, a school, City Hall, a movie, a website, an animal, a banner, an item of clothing (e.g., hat, shoes, etc.), a logo, a map, a photo, etc.

Take a picture of a generic item, such as a shape (e.g., square, triangle, circle, etc.), a man, a woman, a child, an animal (e.g., cat, dog, tiger, etc.), a tall building, a product (e.g., a car, a motorcycle, a bus, a Chevy, etc.), a lake, the ocean, a door, a window, a lamp, a mall, a glass, a hammer, etc.

Take a picture of a special pattern such as a bar code in a store, a CyberCode, a price tag, the special of the day, etc.

Also, if the portable device has two cameras, front and back, simultaneous pictures can be taken with both cameras to create a composite image that shows that the player was really at the expected location.

Referring now to the example shown in FIG. 2, the task transmitted consists of taking a picture of monument 202. Once the user takes the picture 204 of monument 202, the task is complete. In one embodiment, the portable device establishes a network connection to server 210 to notify that the task has been completed. The network connection can be established immediately after taking the picture if the portable device has network connectivity, or can be done at a later time, such as when the portable device connects to a Wi-Fi network. The information regarding the completion of the task is stored in database 212.

In another embodiment, the portable device does not connect to server 210 for task-completion reporting, and instead the portable device reports directly to the game console once the portable device and the console reconnect at the console's location. In yet another embodiment, the portable device establishes a network connection with game console 214 if the portable device has network connectivity and the game console is connected to the network. Portable device 206 then transfers information related to task completion to game console 214 over the network. In response, game console 214 sends confirmation that the task has been completed and may optionally send a new task to the portable device.

Figure 3:
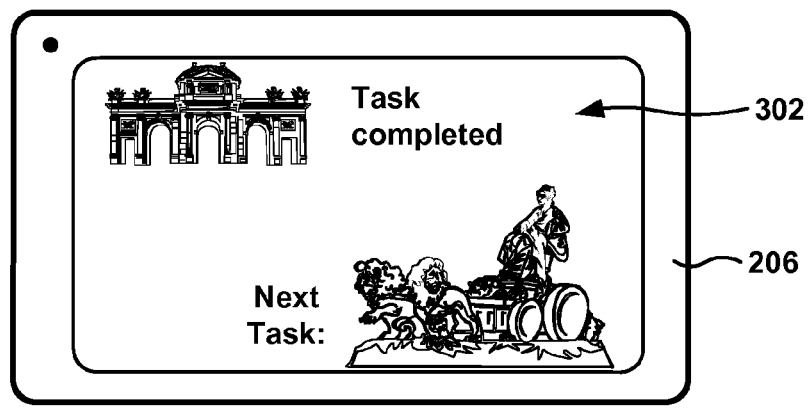
FIG. 3 illustrates a display for assigning a new task, according to one embodiment.

FIG. 3 illustrates a display for assigning a new task, according to one embodiment. Determining if the task has been performed to completion can be done at the portable device, at the server, at a machine at the location of the task, or at the game console. In one embodiment, the portable device determines if the task has been completed. For example, if the task is "take a picture of something red", the portable device analyzes the picture taken and determines that the task is completed if there is a certain minimum percentage of red pixels. Further, the portable device may have built-in simple object recognition or a decoder application used to determine if the image captured by the player fits the requirement of the task. It is up to the game developer to specify how the task recognition application determines what visual information to look for in the captured image.

In the case of validation by the server, the server receives data from the portable device and the server determines if the task is complete. For example, in the case of taking a picture of a monument, portable device 206 sends the picture of the monument to the server. The server then performs image analysis to determine if the picture matches the target document, and if the analysis returns a positive result, then the database is updated with the completion of the task. In one embodiment, the server reports that the task has been completed to the portable device, and in another embodiment, the server waits for the console to access the database and leaves the interaction with the portable device up to the game console.

In some cases, the game server can also communicate an additional task to the portable device, thereby allowing the user to continue playing the game without having to go back to the game console for instructions. The user can continue playing the game wherever the user is. In the example of FIG. 3, the server has determined that the task has been completed and has sent a new task to the portable device, as seen in display image 302. The new task is to take a picture of a different monument in the same city.

Figure 4:
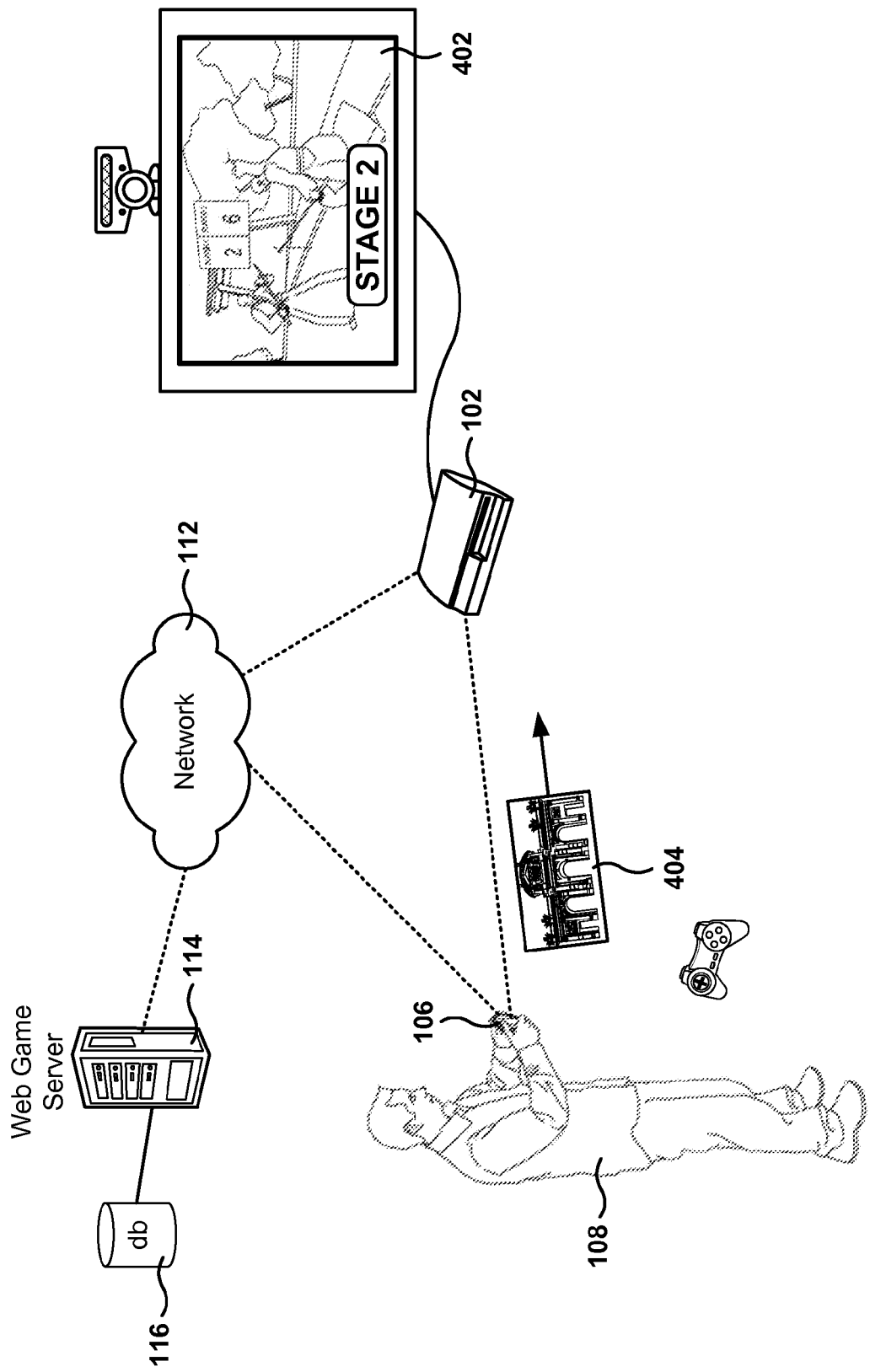
FIG. 4 shows a user making progress on a console game by reporting completion of a task, according to one embodiment.

FIG. 4 shows a user making progress on a console game by reporting completion of a task, according to one embodiment. Once a task is complete, the game will respond with some action in the game that reflects the task completion. The following are some examples of progress in the game:

> If the portable device captures a shape that looks like a triangle, use the acquired shape as a puzzle piece in a puzzle to be solved.
> Receive a coupon to buy an item.
> Give a game character a new power.
> Give a game character new clothing.
> Open a door or passage.
> If the player takes a picture of a red item, change the color of the shirt in a character to red.
> Earn a new life.
> Score points.
> Get a new weapon or some other game accessory.
> Post the name or picture of the player in a website, bulletin board, or blog.
> Earn frequent flyer miles.
> Get a clue for the game.
> Add the player to a club.
> Send a Facebook® friend request to the person in the picture (using image analysis by a central server). If two players take pictures of each other then the system will make them Facebook friends without further action required.

This style of play provides a more immersive experience by allowing the player to track down her goals in the real world. Referring now back to the scenario shown in FIG. 4, after player 108 has performed the assigned task, i.e. taking the picture of the specified monument, portable device 106 establishes a new connection with game console 102 once user 108 returns to the location where game console 102 is located. Once the connection is established, portable device 106 transmits picture 404 to game console 102. Game console 102 then performs image analysis to determine if the task has been completed and reports the results to user 108.

In another embodiment, portable device 106 only transmits information that the task has been completed, because portable device 106 has already verified that the task has been completed. The game console may update the information on database 116 to reflect the task completion immediately, or wait until a later time to perform a database update.

Once game console 102 determines that the task has been completed, the game progresses in the game console by advancing the user to a new place, as can be seen in display image 402 showing that the user has progressed to Stage 2.

Figure 5:
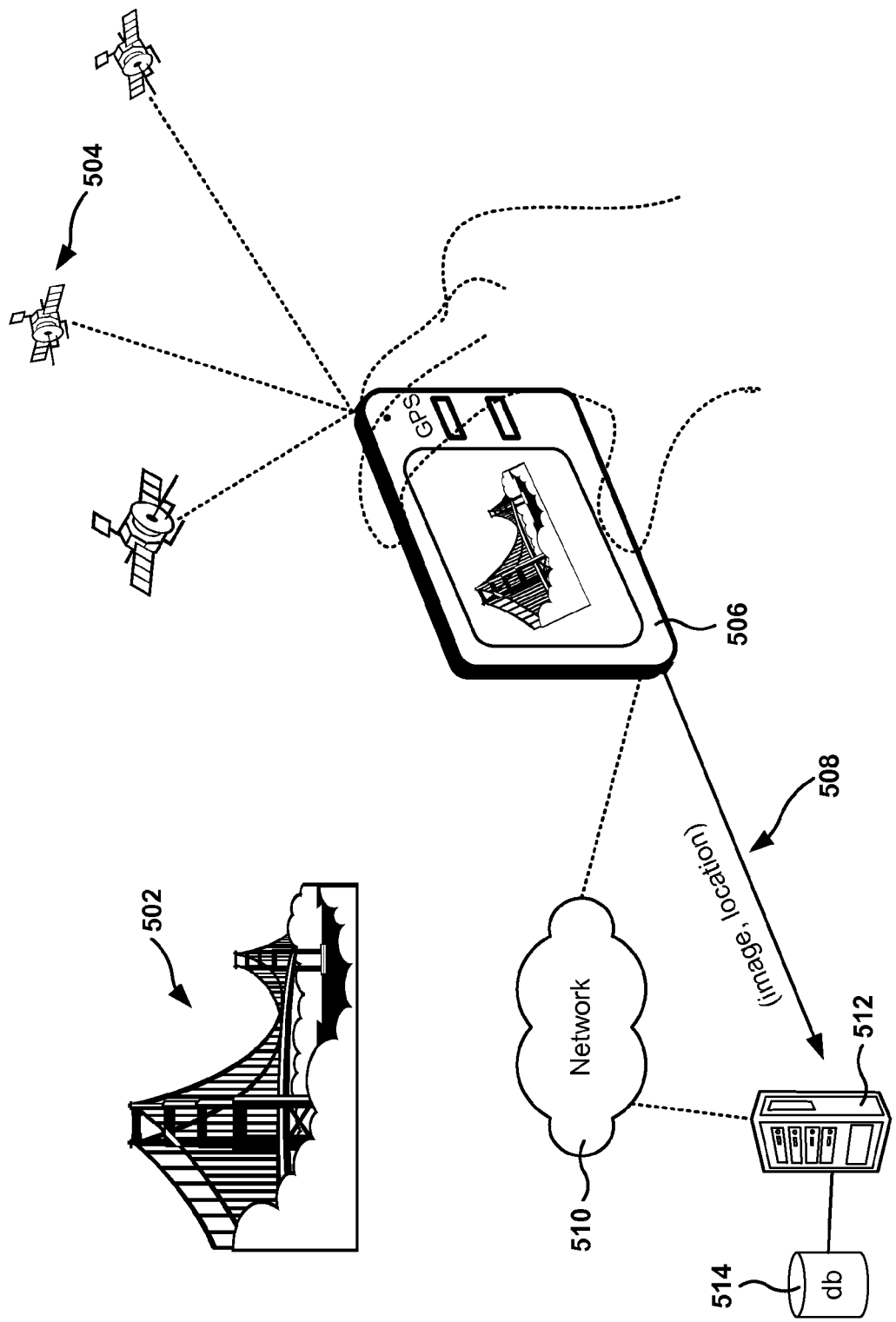
FIG. 5 illustrates the completion of a compound task in accordance with one embodiment of the invention.

FIG. 5 illustrates the completion of a compound task in accordance with one embodiment of the invention. Tasks do not have to be just about capturing images and tasks can be of many types. In general, a task is any action or set of actions that must be completed. Some tasks will include a combination of activities, such as for example going to a specific location, then entering a code found at the location and taking a picture of an object at the location. The following are some additional exemplary tasks:

> Record a sound (e.g., a commercial jingle, a bird, the voice of a certain person, a coin falling on the floor, an explosion, an airplane, etc.)
> Complete a game at the portable device
> Go to a specific location (e.g., address, geographical coordinates, top of a mountain)
> Connect to the Wi-Fi network at a certain location
> Go to a place that can be selected from a plurality of places (e.g., McDonalds in San Francisco, any Macy's in the U.S., a foreign Swiss consulate, 3 Starbucks, a major league stadium, the ocean, fly on an airplane)
> Text a message or send an email
> Meet at the same location with a group of other players (e.g., 3 players must meet at one location with their portable devices, go to an event with at least 5,000 people, go to an event with at least 100 players)
> Scan a code at a store
> Pass a token from the portable device to another user's device. The token can be a coupon, a weapon, clothes for a game, a key, etc.
> Linking or synchronizing a plurality of portable devices together simultaneously Any of these tasks can be combined. For example, a game of scavenger hunt may require performing several tasks, such as going to certain locations, taking a picture of a certain item, ride on a bus, etc. It should be appreciated that the tasks presented above are exemplary tasks. Other embodiments may utilize different tasks. The tasks described herein should therefore not be interpreted to be exclusive or limiting, but rather exemplary or illustrative.

The task illustrated in FIG. 5 includes taking a picture of a monument 502 from a specific location. Portable device 506 includes a Global Positioning System (GPS) unit (that determines geographic position based on GPS satellites 504 or some other method such as mobile phone tower triangulation) that is used to verify that the picture was taken with the portable device at the required location instead of just taking a picture of an image downloaded from the Internet. The image and location are then sent 508 to server 512 to be stored in database 514. In another embodiment, the information is transmitted to the console directly from portable device 506, as previously described in reference to FIG. 4.

Figure 6A:
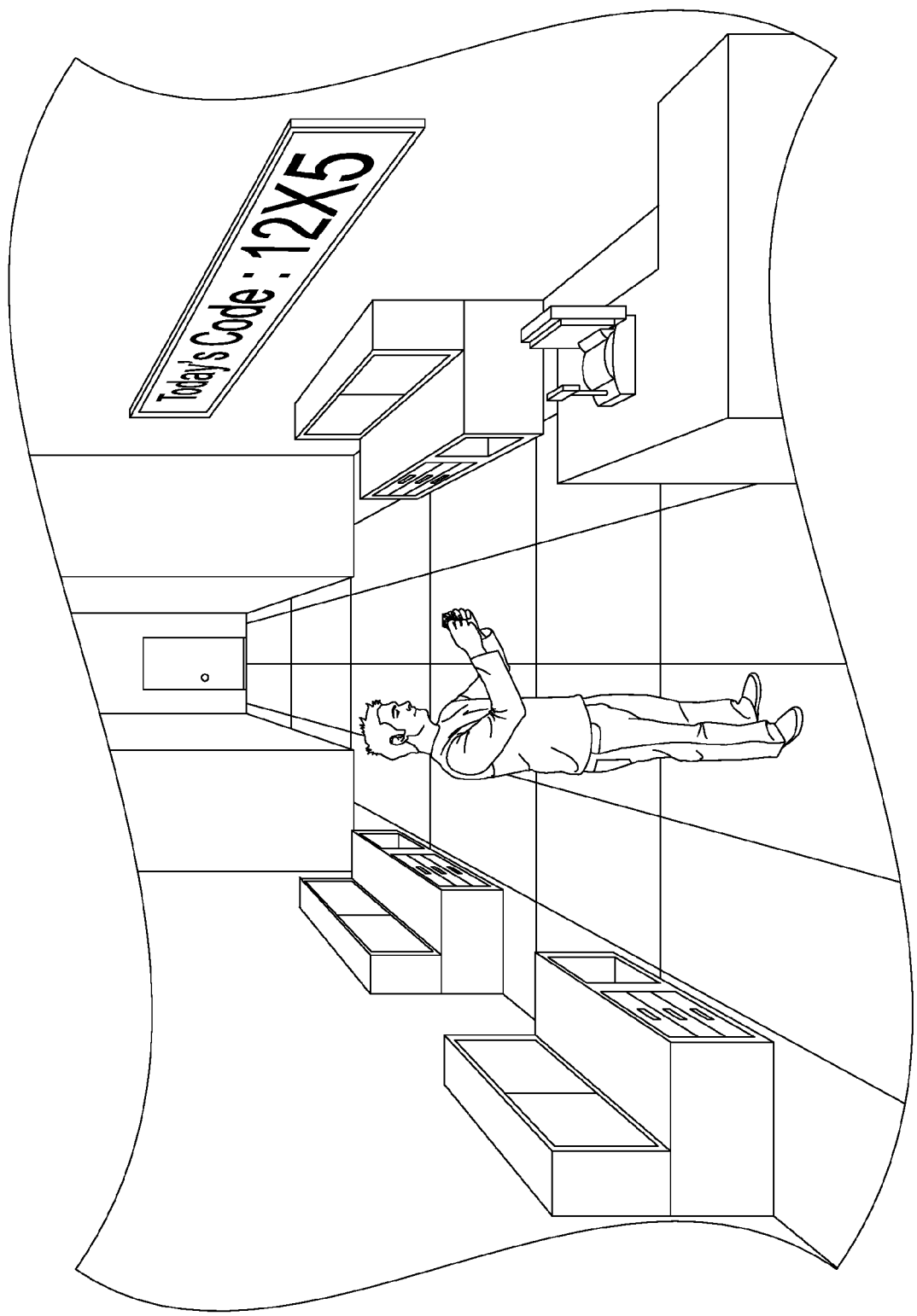
FIGS. 6a-6b show user performing a task by entering a code found at an identified location, according to one embodiment.
Figure 6B:
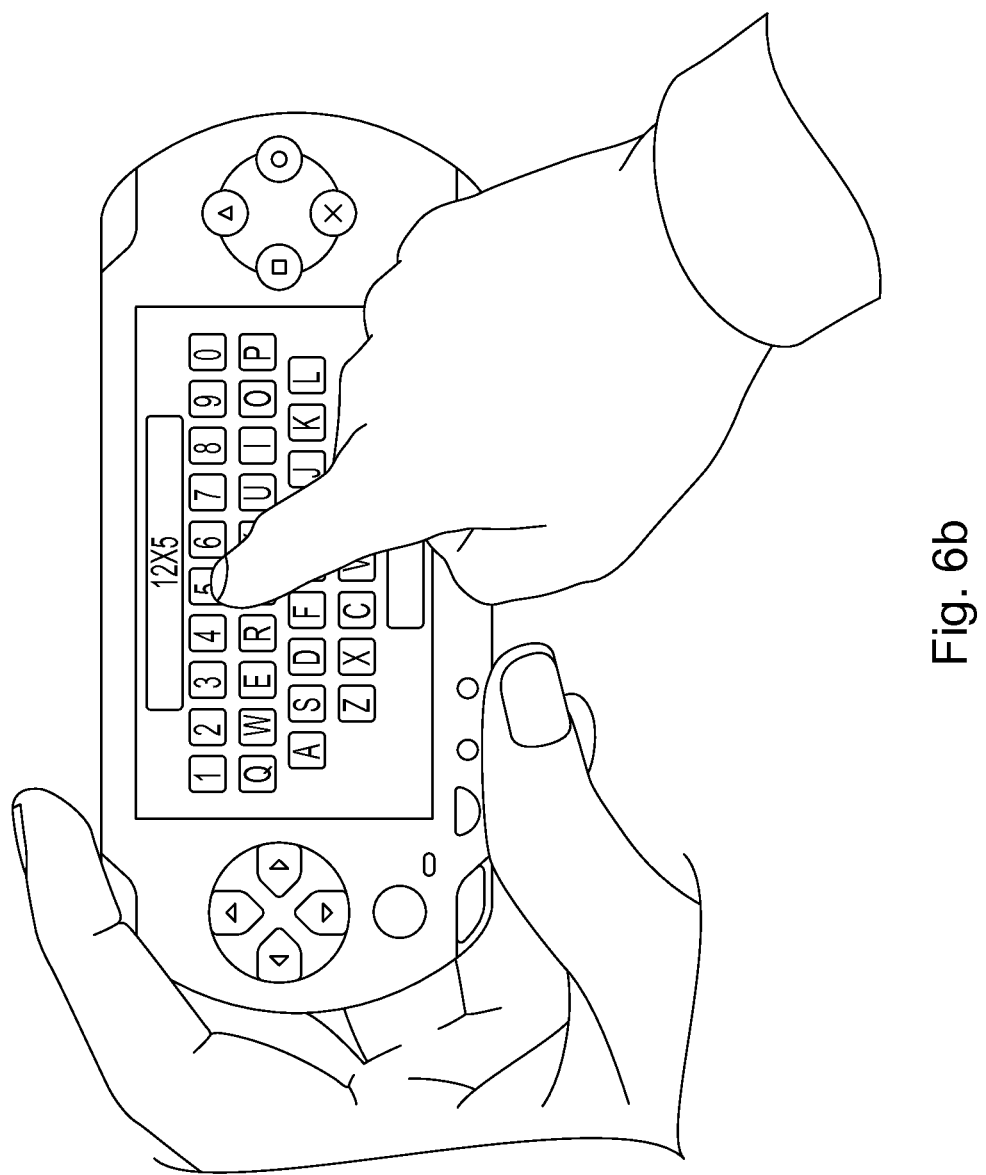

FIGS. 6a-6b show a user performing a task by entering a code found at an identified location, according to one embodiment. The remote task completion is associated with a marketing campaign. The items required to complete the task can be found at different locations, such as retail outlets, special events, print media, collectable playing cards, at the movies, etc. The player must go out in the real world to complete the task in order to receive a benefit, such as a coupon, a free item, a ticket to a concert, etc. In one embodiment, infrared markers are detected by an infrared sensor in the portable device in order to make sure that the portable device is at the required location, thus stopping a player from cheating by taking a picture from a newspaper or the web.

The scenario illustrated in FIG. 6a shows a marketing campaign where the player must go to the store and enter in the portable device a code posted at the store. After the player enters the code in the portable device, as shown in FIG. 6b, the task is completed. In exchange the player gets a marketing reward, such as a free coffee, adding points to his account redeemable for merchandise, a rain check for buying an item in short supply, etc.

Figure 7:
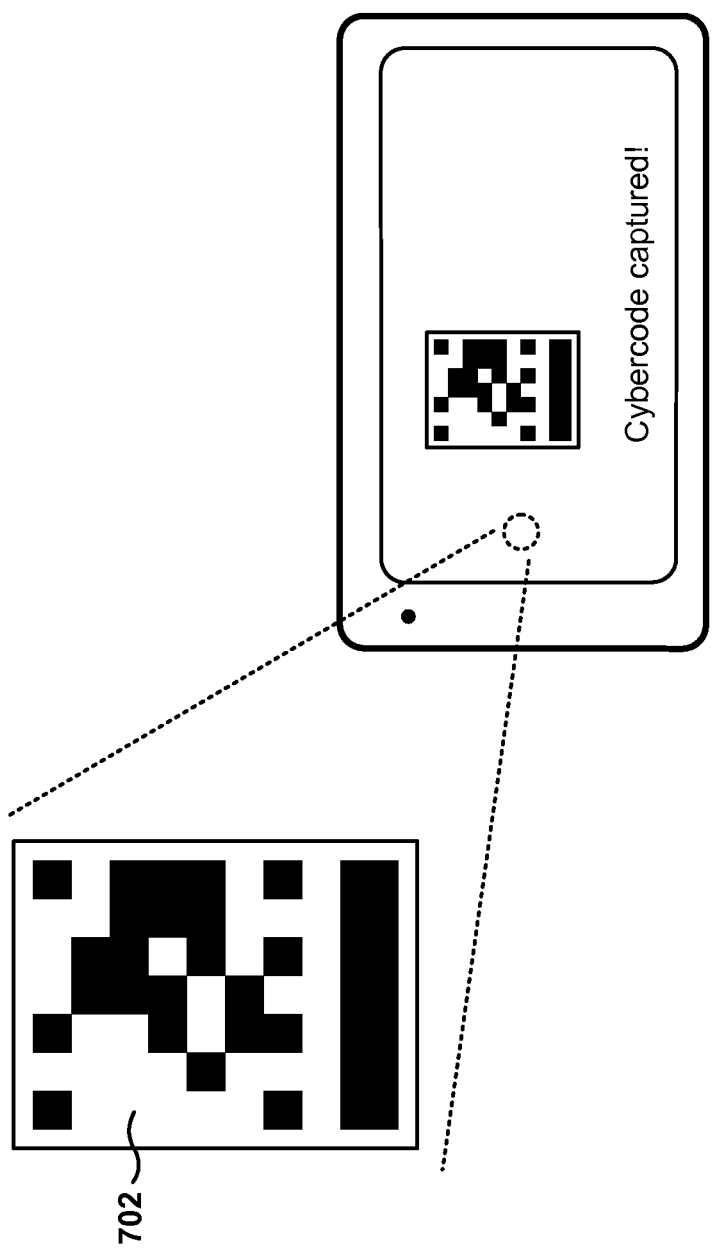
FIG. 7 shows the completion of a task by taking a photo of a CyberCode, according to one embodiment.

FIG. 7 shows the completion of a task by taking a photo of CyberCode 702, according to one embodiment. Mobile tagging is the process of providing data on mobile devices, commonly through the use of data, such as a Uniform Resource Locator (URL), encoded in a two-dimensional barcode meant to be read and inputted using a camera. Commercial tagging use multi-dimensional barcodes, especially in the fields of mobile marketing and advertising. Showcases in this context are additional information on products (e.g. the nutrient content on hamburgers), direct downloads (e.g. free ringtones, clips or mobile games) and the direct link to a specific site of a company.

A CyberCode is a visual tagging system based on a 2D barcode technology. Any computing device with an attached camera can capture the tag and decode the data within the 2D barcode. Additionally, the design of the CyberCode tag allows the computer to track both the tag's 3D position and orientation. The ability for a camera to quickly acquire and track a CyberCode tag as well as its ability to be used with many of the cameras already in use by consumers can be used for performing remote tasks.

First, a CyberCode can be used to simply validate completion of a task. Once user takes a picture of CyberCode 702, the portable device can validate the code to determine that the task has been completed. Secondly, the information encoded in the CyberCode can also be used to, not only validate the location of the user, but also to provide information regarding the next task by the user. For example, the CyberCode can include the location of the next task or a cheat for advancing in the game being played at the game console.

In one embodiment, the portable device is a memory stick that can hold information regarding the goals assigned and the goals completed. For example, the home console places a file with a unique signature on the memory stick as well as a list of goals, such as "visit an Olive Garden restaurant." Once the player arrives at the Olive Garden restaurant, the player plugs the memory stick into a machine. The machine at the restaurant checks the catalog of goals on the stick to ensure that visiting Olive Garden is a pending goal. This prevents the completion of goals before goals are assigned. Further, the machine reads the unique signature from the stick and determines if one of the assigned goals in the memory stick has been completed by visiting the restaurant. Visiting the restaurant could satisfy one or more of the pending goals, such as "visit a restaurant," "visit Olive Garden," "visit an Italian restaurant", "visit a place that has to do with olives," "visit a garden," etc. If a goal is satisfied, the machine creates and signs a file on the stick using the unique signature to indicate that the goal has been completed. The unique signature avoids cheating because players cannot share goal completion files with others, and the signature on the memory stick ensures that there has not been tampering on the signed file.

Figure 8:
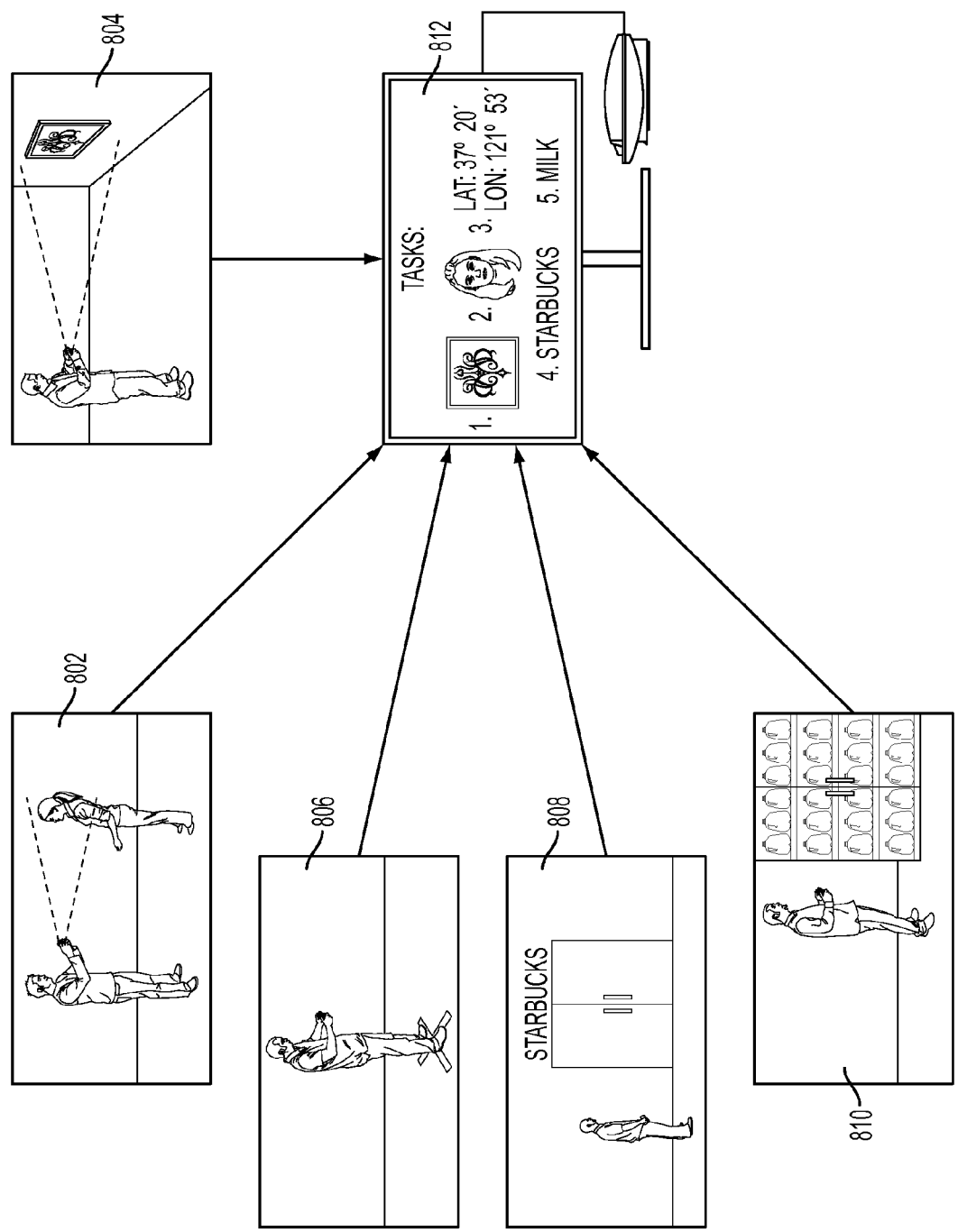
FIG. 8 illustrates team play using portable devices, according to one embodiment.

FIG. 8 illustrates team play using portable devices, according to one embodiment. Remote task completion can be used for team playing in several ways. For example, a list of tasks can be assigned to a team and the team members decide who will perform each task. The same list of tasks can be assigned to see which team completes the list first, such as playing a scavenger hunt game. Tasks can be performed simultaneously by the team members, or can be assigned sequentially to different members as tasks are completed.

FIG. 8 illustrates an example of team play where 5 tasks have been assigned to a team of 5 players. The first task 804 includes taking a picture of a painting at a museum. Once the player takes the picture of the painting, the information is transmitted to the game console that the picture has been taken. In another embodiment, GPS is used to validate that the picture is taken at the museum, as previously described in reference to FIG. 5.

The second task 802 requires taking a picture of a specified woman. The third task 806 consists of transporting the portable device to a specific location defined by latitude and longitude values. The fourth task 808 consists of visiting a Starbucks® store. Finally, the fifth task 810 consists of finding out the price of milk at a certain store. Completing this task requires entering in the portable device the price of a bottle of milk.

After all the players report their tasks completed, the game console will determine that the team task has been completed. If several teams are involved, the winning team will be the team that completed the task first or in the least amount of time. In another embodiment, the team tasks are used to aid or hinder the progress in a game being played by one or more players using static computing devices (game console, PC, etc.). The game executing in one or more static devices progresses as the team tasks are completed. The game may include status updates to inform the members of the team of the progress made by the team members and list the tasks that have been completed and the tasks that have not been completed. In another embodiment, other teams are also informed of the progress of the team to provide information to the teams on how well they are performing in comparison with other teams.

Figure 9:
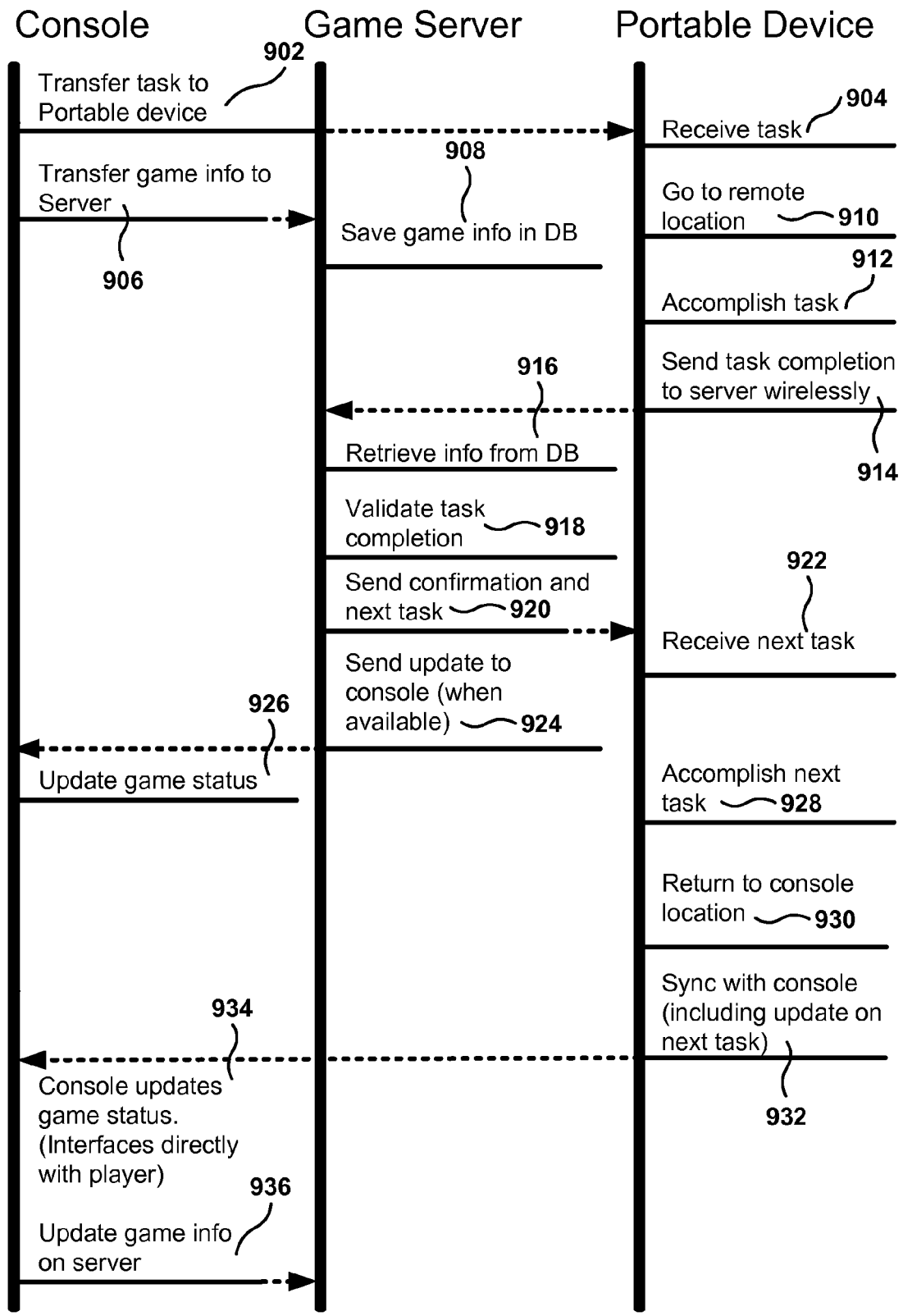
FIG. 9 depicts interactions between console, game server, and portable device, according to one embodiment.

FIG. 9 depicts interactions between console, game server, and portable device, according to one embodiment. In operation 902 the game console transfers a task to the portable device. See for example FIGS. 1, 3, and 5 with the corresponding text for examples of sending the task to the portable device. The task is received at the portable device in operation 904. Additionally, the console transfers game information to the game server in operation 906. The game information transmitted includes data regarding the task assigned to the player and may also include game status information, such as the definition of the next task to be delivered to the user when the assigned task is completed. The game information received from the console is saved by the server in the database in operation 908.

After the player goes to a remote location 910 to accomplish the task 912, the portable device sends task completion information via wireless connection to the game server in operation 914. When the game server receives the task completion information, the game server retrieves information related to the task from the database 916. If the portable device has not validated that the task has been completed, then the game server uses the received information from the portable device and the task information retrieved from the database to validate that the task has been completed 918. After validating the task, the game server sends 920 confirmation of task completion and information about the next task to the portable device. See FIG. 3 for an example of assignment of a new task by the game server. The portable device receives the confirmation from the game server in operation 922, and the user can start performing the next task with the information conveyed by the game server.

When the game console is available and a connection is established between console and game server, the game server sends an update 924 to the console to notify the console that the task was completed. In response, the console updates its internal game status information 926. In operation 928, the user has accomplished the next task using the portable device. After the user returns to the location of the console 930, the portable device is synchronized with the console. The synchronization includes receiving information about the next task 932, if a next task is available. The console updates the game status to reflect the completion of the second task in operation 934, and updates the game information on the server 936.

It should be appreciated that the embodiments illustrated in FIG. 9 are exemplary sequence of method operations. Other embodiments may utilize operations in a different order or may change the way the portable device interacts with the game server and the game console. For example, in one embodiment the portable device only communicates with the game console. The embodiments illustrated in FIG. 8 should therefore not be interpreted to be exclusive or limiting, but rather exemplary or illustrative.

Figure 10A:
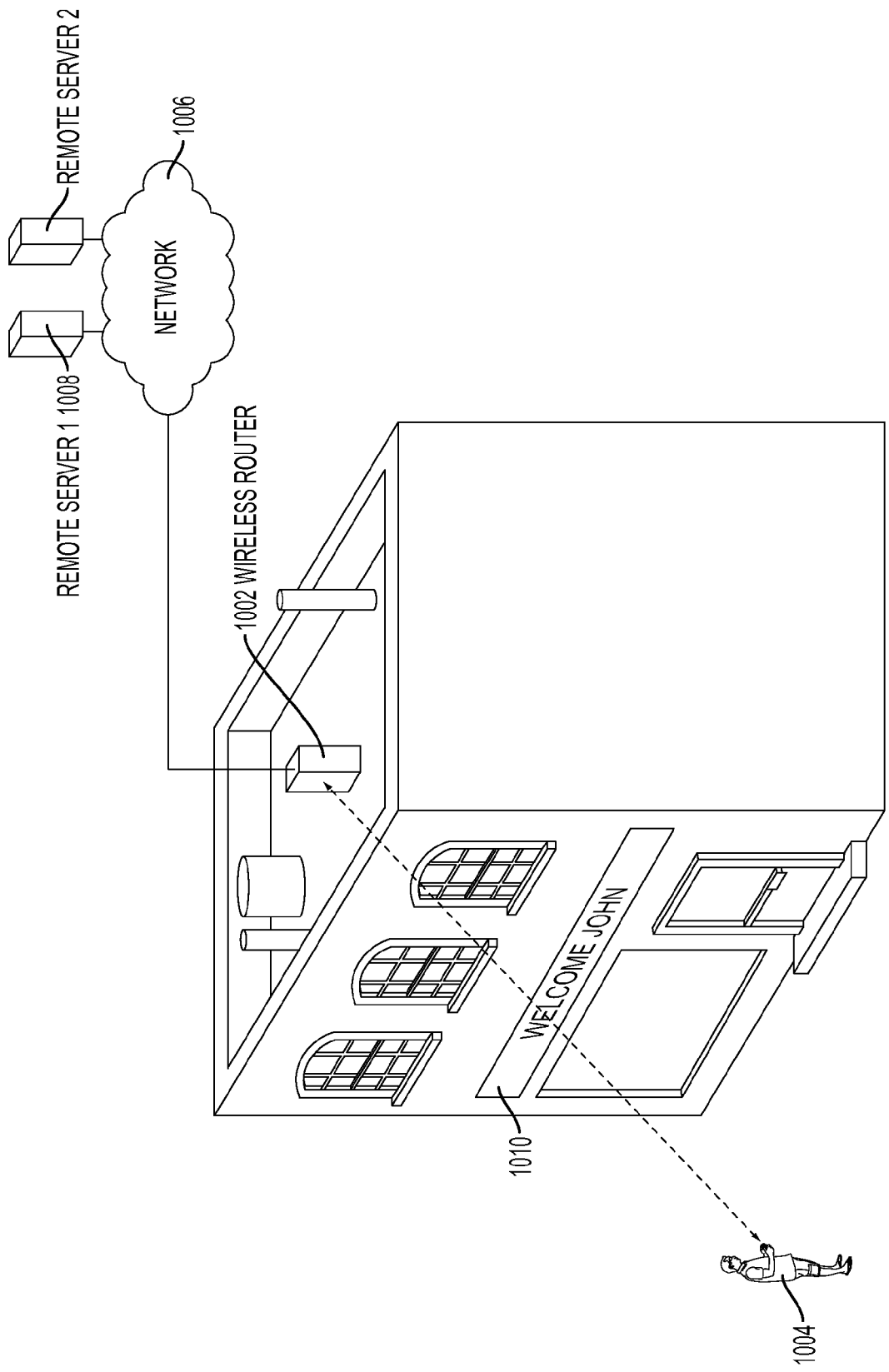
FIGS. 10a-10b illustrate an embodiment of a marketing campaign.
Figure 10B:
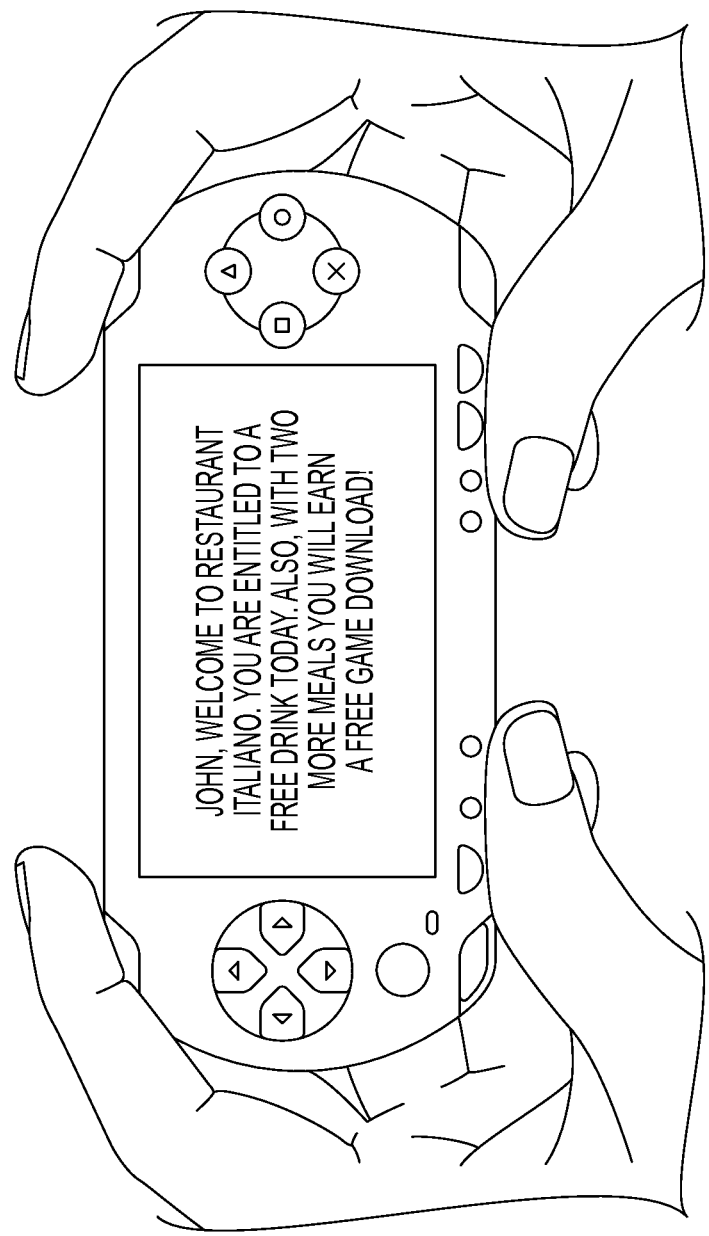

FIGS. 10*a*-10*b* illustrate an embodiment of a marketing campaign. Marketing campaigns can be used to reward loyal customers or to increase brand recognition. For example, if the player accepts a task to go to a certain store then the player gets something in return when the player goes to the store. In the scenario shown in FIG. 10*a*, player 1004 approaches the store. The store is aware of the player's identity, either because the player has been at the store previously, or because the game console notified the database, or because of the unique identifier of the portable device, such as a mobile phone.

Once player 1004 is near the store, the portable device connects to the store's Wi-Fi network, and a connection to network 1006 is established via wireless router 1002. Remote server 1008 can be used to interface with the portable device to validate task completion, as previously discussed. In the scenario of FIG. 10*a*, upon detection player 1004, the store displays welcome message 1010, personalized for player 1004, in a sign outside the store.

Additionally, the player gets a custom message sent to the portable device, as shown in FIG. 10*b*. In this case, the player is notified that he is entitled to a free drink (for completing the task), and that, according to the loyalty plan, the player will get a free game download after two more meals at the restaurant.

This marketing campaign is an exemplary form of a loyalty plan. Other embodiments may utilize different rewards, different messages, wait for the end of the meal to notify the user, use electronic coupons, etc. The embodiment illustrated in FIGS. 10*a*-10*b* should therefore not be interpreted to be exclusive or limiting, but rather exemplary or illustrative.

Remote task completion can also be used in other scenarios that require a person to complete a task at a remote location, and does not have to be related to just game playing or marketing campaigns. For example, parole officers can verify that parolees check in at certain times, unemployment agencies can verify that a person receiving unemployment benefits appears for an interview, a parent can make sure that a teenager meets curfew, a teacher may verify class attendance, a spouse can verify that a traveling spouse arrives at a destination, a rental car company can verify that a client has arrived to the airport, etc.

Figure 11:
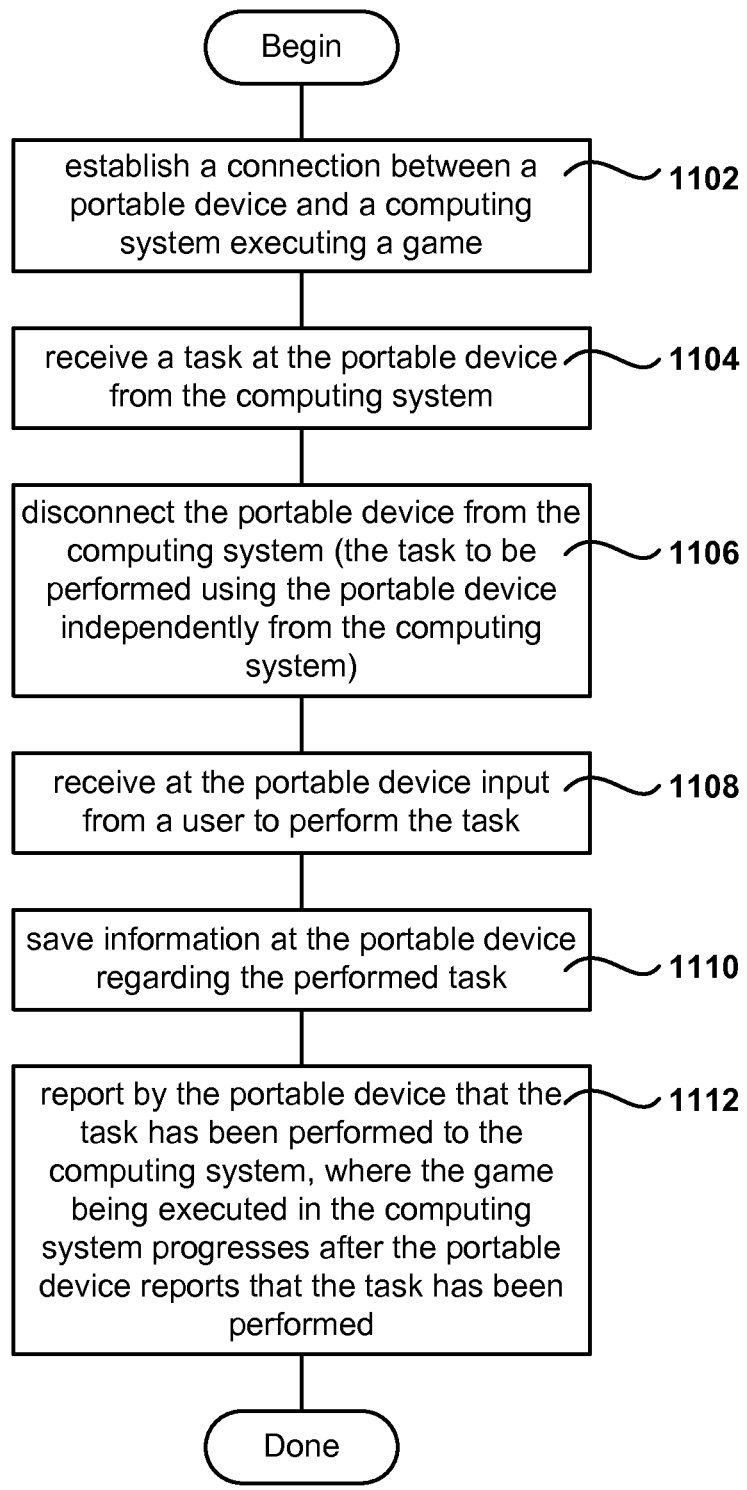
FIG. 11 shows the process flow playing a game using a portable device in accordance with one embodiment of the invention.

FIG. 11 shows the process flow for playing a game using a portable device in accordance with one embodiment of the invention. In operation 1102, the method establishes a connection between a portable device and a computing system executing a game. After establishing the connection, a task is received at the portable device from the computing system in operation 1104.

Once the task is received, the user is free to take the portable device to another location to complete the task. In operation 1106, the portable device is disconnected from the computing system. The task can be then performed using the portable device independently from the computing system. Independently means, that the portable device does not have to be connected to the game console to complete the task and that the portable device is able to complete the task at a remote location. It should be noted, that although the task may be completed independently from the console, the console may still be required to validate that the task has been completed. In another embodiment, validating task completion is done by the portable device, or by the portable device working with a server on the network.

As used herein, the terms "connect" and "disconnect" the portable device with the computing system refer to interactions between the devices. Thus, "connecting" refers to the active exchange of messages between the portable device and the computing system, and "disconnecting" refers to the halting or pausing of communications between the devices. For example, if the portable device and the computing system are connected to the internet, the portable device may be "connected" to the portable device, but in a logical sense the devices are "disconnected" as they are not actively exchanging messages. In general, the portable device does not need to be actively connected to the computing system to perform remote tasks, but it can also be the case where the portable device is connected to the computing system and is able to report right away that a task has been completed. For example, the portable device may take picture of a monument and send the picture to the computing device right away over the Internet to complete the task. One factor to consider is that the portable device does not need the connection to perform the assigned task. For example, a button in a game controller could be pressed by a user, but this action would not be considered a task as defined herein, because the task cannot be completed using the game controller if the game controller is not "connected" to the game console.

In operation 1108 the portable device receives input from a user performing the task. The portable device saves information regarding the performed task in operation 1110. Further, in operation 1112, the portable device reports that the task has been performed by connecting to the computing system. As a result, the game or program being executed in the computing system progresses after the portable device reports that the task has been performed.

Figure 12:
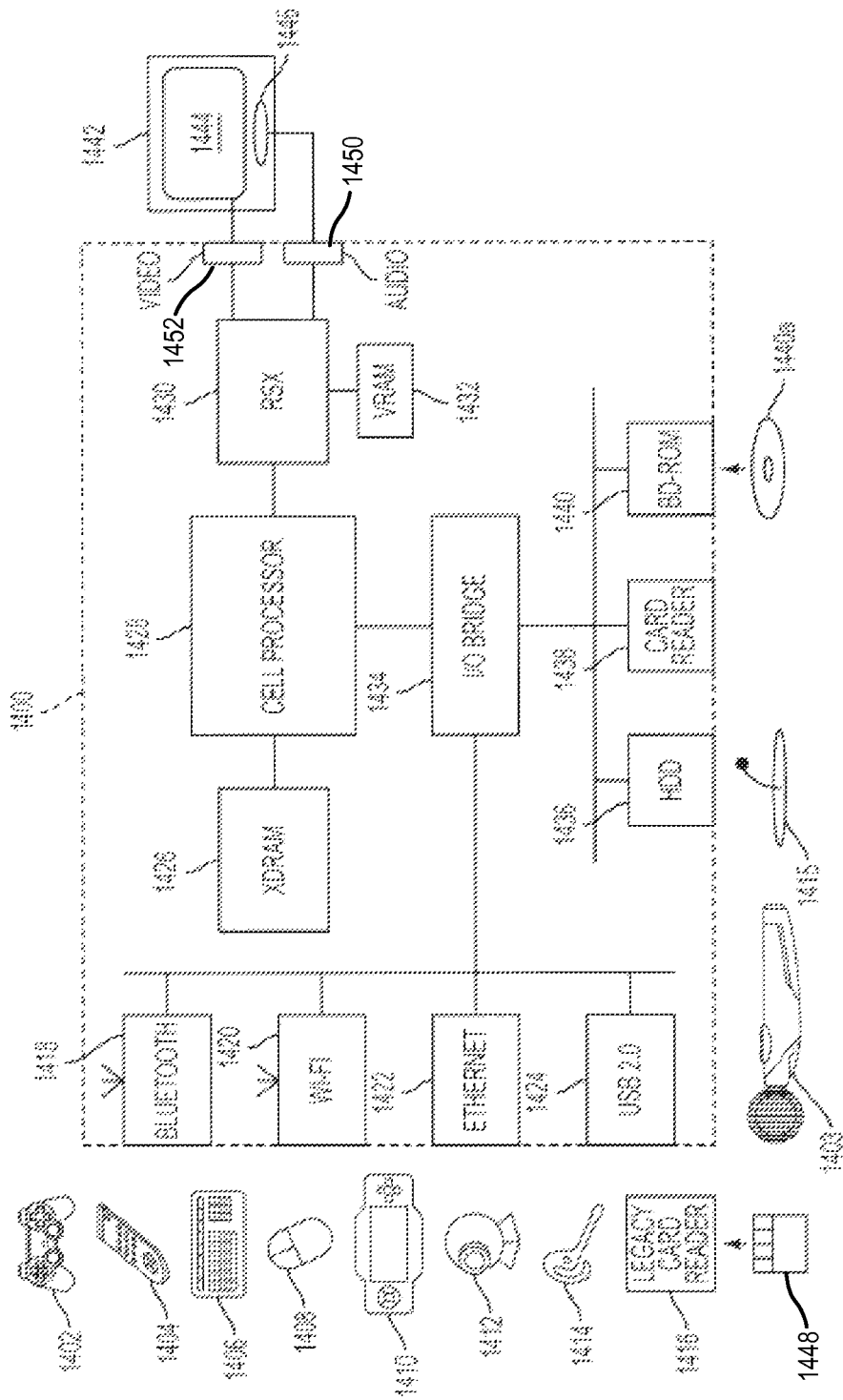
FIG. 12 illustrates hardware and user interfaces that may be used for playing a game using a portable device, in accordance with one embodiment of the present invention.

FIG. 12 illustrates hardware and user interfaces that may be used for playing a game using a portable device, in accordance with one embodiment of the present invention. FIG. 12 schematically illustrates the overall system architecture of the Sony® Playstation 3® entertainment device, a console that may be compatible for playing a game using a portable device in accordance with embodiments of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720$p$, 1080$i$ or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 13:
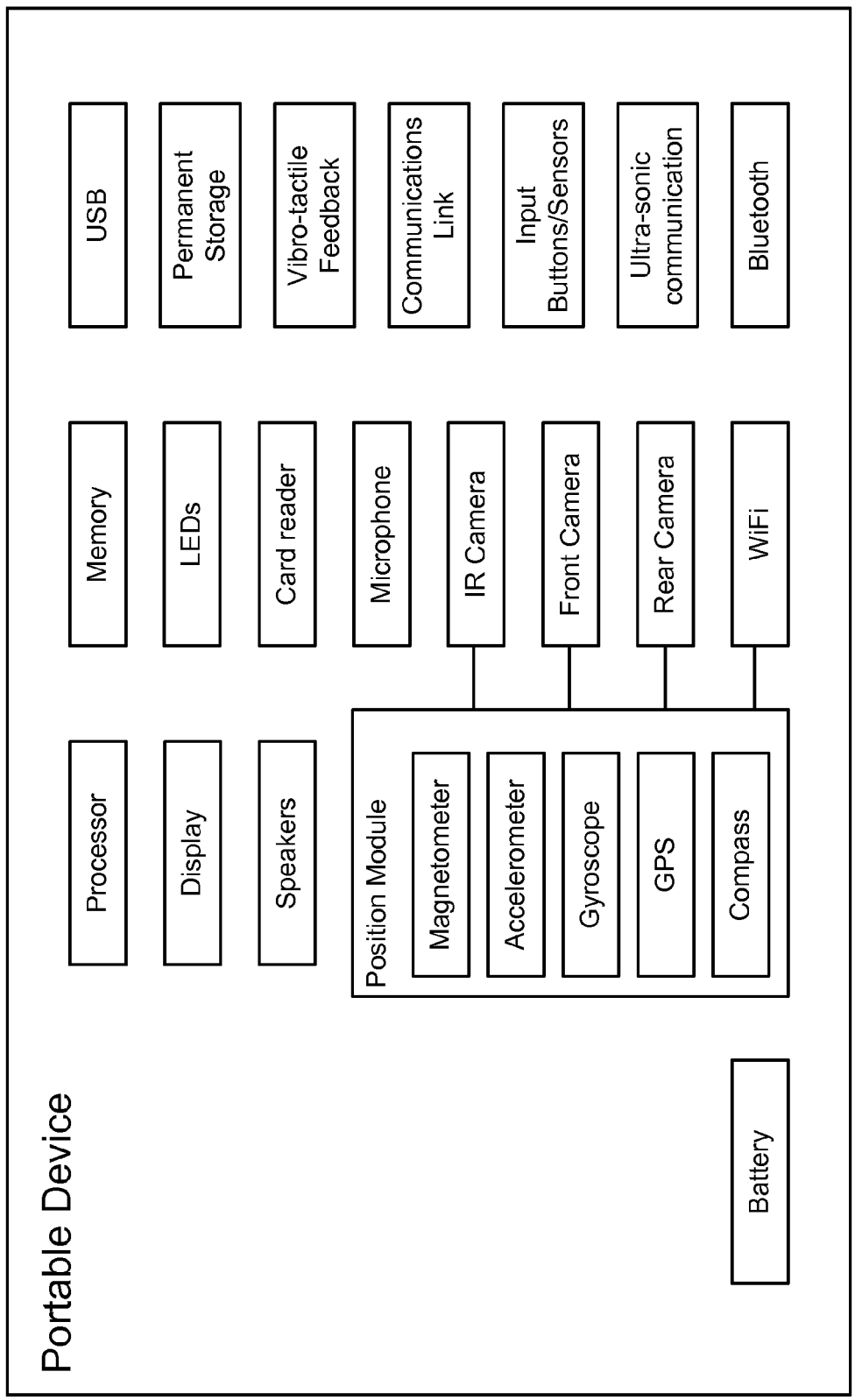
FIG. 13 illustrates the architecture of a device that may be used to implement embodiments of the invention.

FIG. 13 illustrates the architecture of a device that may be used to implement embodiments of the invention. The portable device is a computing device and include typical modules present in a computing device, such as a processor, memory (RAM, ROM, etc.), battery or other power source, and permanent storage (such as a hard disk). Communication modules allow the portable device to exchange information with other portable devices, other computers, servers, etc. The communication modules include a Universal Serial Bus (USB) connector, a communications link (such as Ethernet), ultrasonic communication, Bluetooth, and WiFi.

Input modules include input buttons and sensors, microphone, touch sensitive screen, cameras (front facing, rear facing, depth camera), and card reader. Other input/output devices, such as a keyboard or a mouse, can also be connected to the portable device via communications link, such as USB or Bluetooth. Output modules include a display (with a touch-sensitive screen), Light-Emitting Diodes (LED), vibro-tactile feedback, and speakers. Other output devices can also connect to the portable device via the communication modules.

Information from different devices can be used by the Position Module to calculate the position of the portable device. These modules include a magnetometer, an accelerometer, a gyroscope, a GPS, and a compass. Additionally, the Position Module can analyze sound or image data captured with the cameras and the microphone to calculate the position. Further yet, the Position Module can perform tests to determine the position of the portable device or the position of other devices in the vicinity, such as WiFi ping test or ultrasound tests.

It should be appreciated that the embodiment illustrated in FIG. 13 is an exemplary implementation of a portable device. Other embodiments may utilize different modules, a subset of the modules, or assign related tasks to different modules. The embodiment illustrated in FIG. 13 should therefore not be interpreted to be exclusive or limiting, but rather exemplary or illustrative.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a non-transitory computer readable medium. The computer readable medium is any non-transitory data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The non-transitory computer readable medium can include non-transitory computer readable tangible medium distributed over a network-coupled computer system so the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer program embedded in a non-transitory computer-readable storage medium, when executed by one or more processors, for playing a game using a portable device, the computer program comprising:
   program instructions for establishing a connection between a portable device and a computing system executing a game;
   program instructions for receiving a task at the portable device from the computing system after establishing the connection, the task being a game-related task to progress in the game, wherein the task is configured to be performed at a remote location away from the computing system, the remote location away from the computing system being defined in the task, wherein the task includes taking simultaneous pictures with the portable device of areas in front and behind the portable device using two separate cameras;
   program instructions for disconnecting the portable device from the computing system, wherein the task is defined to be performed using the portable device while the portable device is disconnected from the computing system;
   program instructions for receiving user input at the portable device to perform the task while the portable device is disconnected, the task being completed when the input is received while the portable device is in the remote location away from the computing system;
   program instructions for saving information at the portable device regarding the completed task; and
   program instructions for reporting by the portable device that the task has been completed to the computing system after the connection is re-established, wherein the game being executed in the computing system progresses after the portable device reports that the task has been completed.

2. The computer program as recited in claim 1, wherein the task includes taking a picture with the portable device of an item selected from a group consisting of a shape, a person, a building, a color, a bar code, a CyberCode, and an infrared marker.

3. The computer program as recited in claim 1, wherein the task includes performing an action with the portable device when the portable device is at a specific geographic location designated by the task.

4. The computer program as recited in claim 1, wherein the task includes carrying the portable device to a specific geographic location designated by the task.

5. The computer program as recited in claim 1, wherein the task includes successfully completing a different game at the portable device.

6. The computer program as recited in claim 1, wherein the task includes capturing a sound with the portable device at the remote location.

7. The computer program as recited in claim 1, wherein the task includes linking a plurality of portable devices together simultaneously.

* * * * *